March 6, 1928. 1,661,422

W. GENEST

PLATE FOR DEADENING VIBRATION AND SOUND

Filed Nov. 25, 1925

Inventor:

Patented Mar. 6, 1928.

1,661,422

UNITED STATES PATENT OFFICE.

WERNER GENEST, OF BERLIN-LICHTERFELDE, GERMANY, ASSIGNOR TO THE KORFUND COMPANY, INC., OF NEW YORK, N. Y., A CORPORATION OF NEW YORK.

PLATE FOR DEADENING VIBRATION AND SOUND.

Application filed November 25, 1925, Serial No. 71,402, and in Germany November 27, 1924.

The invention has for its object a plate to be arranged in the walls of buildings, bridges, tunnels or at other places in order to prevent noises and vibrations from spreading beyond said plate through the walls. Such noises and vibrations may be caused through engines, machines, trucks, railroad cars or through traffic of people in buildings.

For this purpose the isolating plate must have the ability to carry the load of the walls without causing sagging or cracking of the walls. The isolating plate must be of such a composition as to destroy existing noises and vibrations. The plate must also be capable to resist the chemical action of masonry or concrete.

Other plates so far used for this purpose consist mainly of organic materials such as cork, felt, and other matter. These other plates have the drawback, that they are not elastic enough to destroy waves of sound and vibrations as soon as the plates have the necessary firmness to support the load of the walls. They also have the disadvantage, that they quickly disintegrate under the chemical action of the masonry or building.

Figure 1:
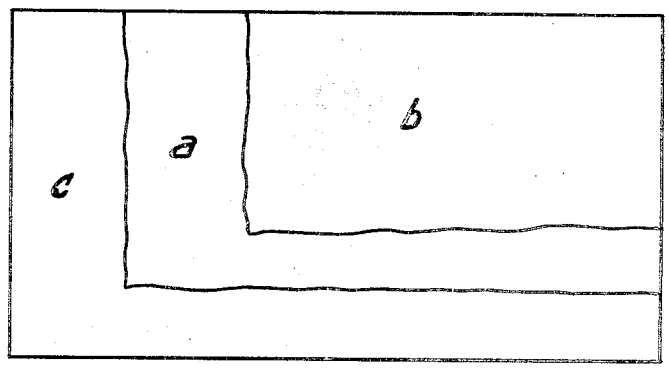
Figure 2:
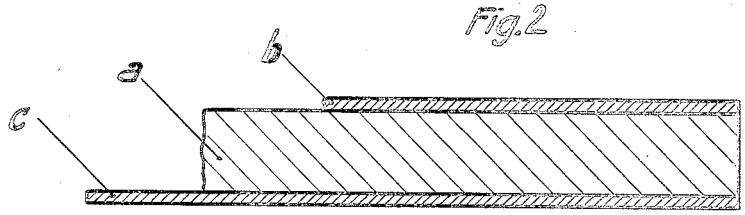

My invention does away with the above drawbacks. When referring to the annexed drawing: Figure 1 shows a plan view and Figure 2 shows a cross section through my plate. I use a plate consisting of a layer of firmly compressed, yet elastic, cork, felt, rubber or the like, marked $a$, between 2 plates of card board, roofing paper or the like, which are impregnated with asphalt tar or similar material, marked $b$ and $c$.

Figure 3:
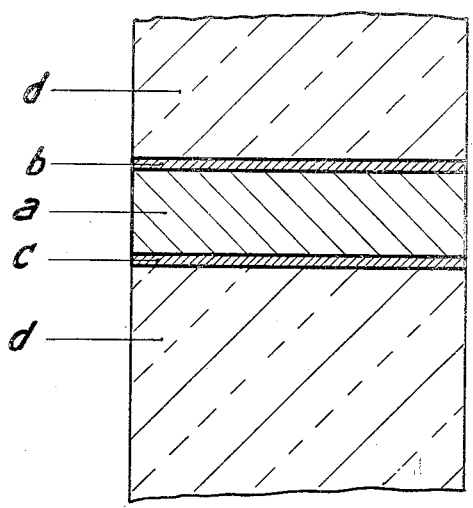

The advantage of such a combination of materials is, that the waves of sound and vibrations are repeatedly broken and thereby destroyed through the passage from one material to the other one. The outer layers; being impervious to water and offering a great resistance against the action of chemicals, furthermore protect the inner layer against disintegration. Figure 3 shows the arrangement of my plate in the walls $d$ of a building.

A greater number of layers than shown may be placed together in my plate. The different layers may be joined together by pasting, nailing or in any other suitable manner.

I claim:

A plate capable of insertion in the walls of buildings and like structures for use in the preventing of transmission of vibrations and sound therethrough, said plate including a central layer of firmly compressed cork of sufficient elasticity to absorb vibrations transmitted to the plate through the wall in which it is mounted, and outer layers of cardboard on opposite sides of said central layer and engageable with surfaces of the wall in which said plate is embedded, said outer layers being impregnated with asphalt and tar to render them impervious to water and highly resistive to chemicals and said outer layers being capable of absorbing sound vibrations transmitted to said plate through the atmosphere.

In testimony, that I claim the foregoing as my invention I have signed my name.

WERNER GENEST.